US006033119A

United States Patent [19]

Becker et al.

[11] Patent Number: 6,033,119

[45] Date of Patent: Mar. 7, 2000

[54] LOCOMOTIVE RUNNING WHEEL BLOCK QUIPPED FOR SIMPLIFIED REPLACEMENT OF WORN PARTS

[75] Inventors: Eberhard Becker, Hagen; Udo Gersemsky, Herdecke; Winfried Gievers, Wetter; Klaus-Peter Hoffmann, Schwerte; Karl Liebig, Wetter; Bernd Neupert, Wetter; Hans-Hermann Osthoff, Wetter; Thomas Schweflinghaus, Wuppertal; Roland Staggl, Wetter; Karl Zacharias, Schwerte, all of Germany

[73] Assignee: Mannesmann AG, Düsseldorf, Germany

[21] Appl. No.: 09/062,977

[22] Filed: Apr. 20, 1998

[30] Foreign Application Priority Data

| | | | |
|---|---|---|---|
| Oct. 18, 1995 | [DE] | Germany | 195 40 220 |
| Oct. 18, 1995 | [DE] | Germany | 195 40 215 |
| Oct. 18, 1995 | [DE] | Germany | 195 40 216 |
| Oct. 18, 1995 | [DE] | Germany | 195 40 217 |
| Oct. 18, 1995 | [DE] | Germany | 195 40 219 |

[51] Int. Cl.$^{7}$ .......... F16C 35/00; F16C 13/00; B60B 17/00

[52] U.S. Cl. .......... 384/428; 384/544; 295/1; 301/6.3

[58] Field of Search .......... 384/544, 510, 384/513; 295/1, 7, 21, 36.1; 301/6.3, 6.91

[56] References Cited

U.S. PATENT DOCUMENTS 2,415,924 2/1947 Wells .......... 384/544

*Primary Examiner*—Tamara L. Graysay
*Assistant Examiner*—Colby Hansen
*Attorney, Agent, or Firm*—Cohen, Pontani, Lieberman & Pavane

[57] ABSTRACT

A running wheel block, including a housing having at least one connecting surface for connection to a supporting structure, an inwardly directed rotary bearing holding hub arranged in the housing, a rotary bearing mounted on the hub, and a running wheel mounted in the rotary bearing so that a section of its running surface projects from the housing toward at least one side. The housing is open on a side opposite to the holding hub. The running wheel encompasses the holding hub and is insertable onto or into the rotary bearing from the open side.

2 Claims, 2 Drawing Sheets

LOCOMOTIVE RUNNING WHEEL BLOCK QUIPPED FOR SIMPLIFIED REPLACEMENT OF WORN PARTS

This is a Continuation application under 35 U.S.C. §120 and 35 U.S.C. §365(a) of international PCT Application No. PCT/DE96/02023 which was filed on Oct. 18, 1996, published as publication No. WO 97/14645 on Apr. 24, 1997, and claims priority from German Applications Nos. 195 40 220.0; 195 40 215.4; 195 40 216.2; 195 40 217.0 and 195 40 219.7 all filed on Oct. 18, 1995.

BACKGROUND OF THE INVENTION

1. Field of the Invention

The invention relates to a running wheel block with a housing with at least one connecting surface.

2. Discussion of the Prior Art

A running wheel block of this type is known from German reference DE 31 34 750 C2. This known running wheel block is composed of two halves of the bearing housing, which are welded together or otherwise connected to each other, and has inwardly pressed pivot bearing seats for bearings that support the hub of the running wheel. Attached to the pivot bearing seats are stop faces for the bearings, which stop faces are directed toward the hub. The hub of the running wheel extends over the bearings and rests directly over them on the housing. The housing, on its outer rings on both sides, has ring grooves for snap rings located on the bearing fronts, and also has a holding hole with internal toothing for the external toothing of a drive shaft. This design has been in successful use for years. However, the need to minimize costs and improve function still exists.

In the known running wheel block, it is disadvantageous that, to exchange the running wheel, the running wheel block in its entirety must be completely removed from the supporting framework.

After the running wheel is exchanged, the entire running wheel block is reattached to the supporting framework, exactly as during the initial assembly, by means of screws. For this purpose, the position of the running wheel block, relative to the supporting framework with the other running wheels, must be oriented so that the rotational axis of the running wheel runs at a right angle to the path on which the running wheel rolls. Due to this complicated orientation procedure, assembly is time-consuming and, because of the lengthened down time, cost intensive. If the orientation procedure is not carried out, the danger exists that the running wheels will abrade as the result of skewed running on their path and will thus become worn more quickly. Further, when the application involves a bridge crane, the danger exists that the performance of the sensitive bridge crane will be disrupted by skewed running, canting or wheel flange wear. In addition, as the skewed running angle increases, lateral forces arise, which place stress, in addition to the operating stress, on the supporting framework or the like.

Further, French reference FR A 2667543 describes a running wheel block with a housing that consists of two housing halves, which jointly form the connecting surface on one side of the housing. To exchange parts subject to wear, this running wheel block must also be completely removed from the supporting framework and disassembled.

Thus, after reattachment of the running wheel block, a new orientation and adjustment procedure is required.

SUMMARY OF THE INVENTION

Accordingly, it is an object of the present invention to provide a running wheel block in which it is possible to exchange parts subject to wear without removing the running wheel block from the supporting framework. In addition, manufacturing and assembly costs are to be minimized by a further embodiment of a running wheel block, and customer benefits are thus to be increased.

Pursuant to this object, and others which will become apparent hereafter, one aspect of the present invention resides in the housing being open on the side opposite to the holding hub. The running wheel encompassing the holding hub can be inserted onto or into the rotary bearing from the open side.

It is thus proposed that the running wheel block have a housing with at least one connecting surface for connection to a supporting framework, and that this housing need not be completely removed to exchange parts subject to wear, so that the housing remains attached to the supporting framework in a substantially oriented fashion. To exchange parts subject to wear, the inwardly directed holding hubs for the rotary bearings of the running wheel are arranged and oriented so that the parts subject to wear can be removed and reinstalled from an openly embodied housing side, without the running wheel block having to be readjusted at the end.

Because of the float-mounting of the running wheel that exists in this case, an exchange of the running wheel and the bearings is possible with very little expense, specifically, in the installed state of the running wheel block. The cover of the housing serves only as a protective cover.

It is further proposed that the housing have at least one head, cheek or front connecting surface, which absorbs the carrying force and extends roughly to the housing width or the running wheel width, and that the housing be embodied on one cheek side in the direction of the shaft axis without a supporting housing part. A running wheel block mounted in this way remains oriented, even during removal of the slide and roller bearings and/or of the running wheel, because the slide and roller bearings as well as the running wheel can be drawn away toward a side where sufficient space for the removal movement exists. The present invention permits the exchange of the running wheel and/or bearing without the housing having to be removed from the supporting framework. As a result, the time-consuming and cost-intensive orientation procedure following the exchange of parts subject to wear is dispensed with. The housing can continue in use and remains oriented on the supporting framework or the like as long as desired.

Further, there is the advantage that in addition to detachable connecting means, it is also possible to use non-detachable connecting means, because the block-type housing no longer needs to be removed from its carrier or travelling frame.

It is also advantageous that the housing is produced in a single piece and is open toward the bottom and toward one cheek side. Because of this one-piece design, it is not necessary to connect multiple housing parts to one another, so that, in particular, attachment means as well as assembly times and production times (set-up times) are saved.

For assembly-friendly mounting, it is proposed that a housing hub formed on asymmetrical to the width-central plane be provided as the holding hub, which reaches axially to below the rotary bearing and holds the rotary bearing. The running wheel is also equipped with an asymmetrically formed-on running wheel hub that reaches from the open cheek side of the housing into the housing hub and is connected to the shaft. Moreover, through these measures, considerable savings in structural space are attained, which also result in material savings in the running wheel and the housing of the running wheel block. In addition, an especially simple running wheel geometry is achieved for non-driven running wheels.

According to a further embodiment, the head connecting surface and/or the carrying-capable cheek connecting surface and/or at least one front connecting surface and/or at least one partial connecting surface and/or a foot connecting surface is divided into supported and non-supported partial surfaces. As a result, the introduction of force becomes more defined than before, and there are considerable savings in the metal removal rate and metal removal volume during the manufacture of the running wheel block.

It is also advantageous that one supported partial surface is not divided, i.e., has no partition line. Given a homogeneous material and smaller partial surfaces as connecting surfaces, the evenness of the surface is more precise than in the case of multiple or larger partial surfaces. Furthermore, forces are introduced into the connecting structure in a defined manner via the smaller partial surfaces. This allows an optimized design of the connecting structure in the case of a known force flow.

The design according to the invention also allows a broad spectrum of different manufacturing methods. Contributing to this is the fact that the housing hub, in the cross-section penetrated by the shaft, is embodied in the form of a first cone, which faces away from the cheek side and lies with its larger diameter on the open cheek side. A stress-capable design is created, with the least possible use of material, by the fact that on the housing hub, in the cross-section penetrated by the shaft, a second cone running in the opposite sense is connected to the first cone, the larger diameter of which second cone is arranged facing away relative to the larger diameter of the first cone.

According to the invention, the advantageous use of space can be taken so far that the outer surface of the running wheel hub is adjusted to the inner surface of the second cone with a distancing gap.

A further improvement is that the housing hub and/or the running wheel hub are embodied in a cylindrical or graduated fashion. The particular application is based, e.g., on the available manufacturing methods.

Another contribution to good use of space is the fact that the wheel rim of the running wheel and the running wheel hub are connected by means of a web cross-section embodied in a flatly conical manner relative to the width-central plane.

A compact design is also advantageously achieved by the fact that one or more rotary bearings are arranged symmetrically to the width-central plane in the interior of the running wheel or on the housing hub.

Easy removal of the rotary bearings and/or of the running wheel accompanies, in principle, an opening that is to be created and must be protected against penetration by dust and dirt. Therefore, according to a further embodiment, the open cheek side of the housing, embodied without a supporting housing part, is closed by means of a detachable cover disk. This detachable design facilitates the lateral removal of the bearing and/or of the running wheel. Lateral removal reduces the disassembly and assembly expense of the running wheel, because now the supporting framework, the carrier or the travelling frame must be elevated only by the wheel flange height of the running wheel.

According to the invention, further advantages result from the fact that the housing, on the support cheek connecting surface, is embodied, in each case, with a flange contact surface for attachment elements. The solid side of the housing can therefore be used for the purpose of flanging on and detachable or non-detachable attachment.

In yet another embodiment the head connecting surface has one or more through holes. The running wheel radius can therefore be advantageously enlarged by more than the thickness of the upper plate limit. It is also advantageous that the through hole prevents contaminating deposits in the event that the open side of the housing, from which the running wheel projects, is directed opposite to the direction of gravitation (i.e., is directed upward).

However, it is also possible for the through holes to be closable by means of closing pieces, which do not need to be manufactured from the same material as the housing, because they do not absorb carrying forces and need not have the same stress capacity. The closing pieces prevent the penetration of dirt or other impurities, even in the event of the open side of the housing, from which the running wheel projects, is directed in the gravitational direction (i.e., is directed downward).

In a further embodiment of the invention, the head connecting surface has at least one recess that runs parallel to the running wheel axis. This allows prefabricated bolts to be used. This in turn permits the hole pattern of the counterpiece to be imprecise without leading to disadvantages, because the bolts can move in the recess and adjust to the imprecise hole pattern.

The aforementioned recess can also be designed as a channel guide, through bore, or threaded bore. The suitable type of through hole can be selected in accordance with the precision of the connection.

In yet an additional embodiment channel nuts for connecting screws can be run in the channel guides in a cross-adjustable manner and with little play. This embodiment thus facilitates the connection and orientation between the supporting framework, carrier, travelling frame or the like and the housing of the running wheel block during initial assembly.

Furthermore, at least one partial connecting surface is formed on the outer surface of the housing (from which the running wheel projects) opposite to the head connecting surface. Therefore, it is also possible to attach other aggregates, e.g., guide rollers, measurement devices and the like, to this partial attachment surface. This partial connecting surface can also be embodied so that the entire running wheel block located on this surface can be connected to the supporting framework, carrier or travelling frame.

For the attachment of further aggregates, it is advantageous that the outer front connecting surfaces of the housing be undivided and respectively constitute surfaces to absorb carrying forces.

To save weight, it is proposed that the housing and/or the cover be made of a material processed in a molten state. In particular, light metal materials and plastics can be used. The use of these materials also avoids corrosion.

For medium stresses, it is foreseen that the material will consist of a light metal alloy.

It can also be advantageous for the material to be an iron alloy, if such strengths are required.

For economical processing, it can be advantageous for the material to consist of a plastifiable plastic.

In this regard, it can be desirable to attain both adequate strength and low weight in the components. For this purpose, it is proposed that the material be a composite material or form a composite material with other materials.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1C:
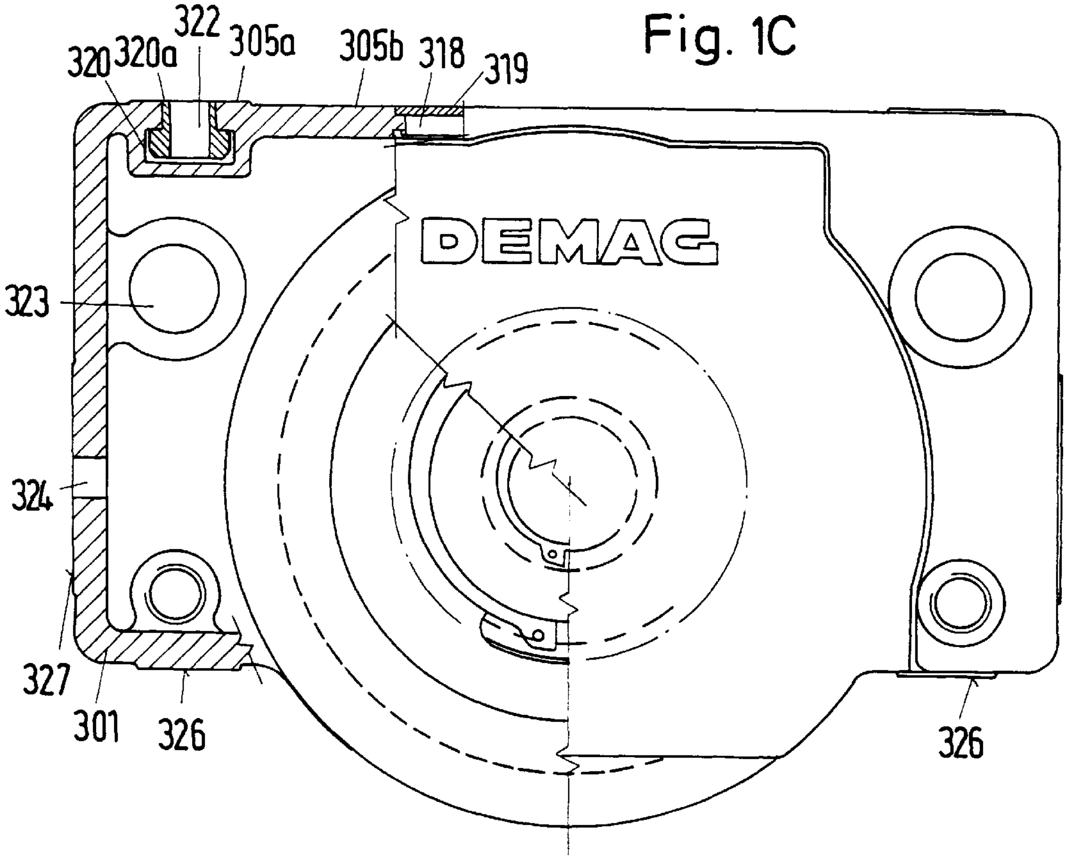
FIG. 1C is a front view of the entire wheel block pursuant to the present invention in the direction of the shaft axis.
Figure 4C:
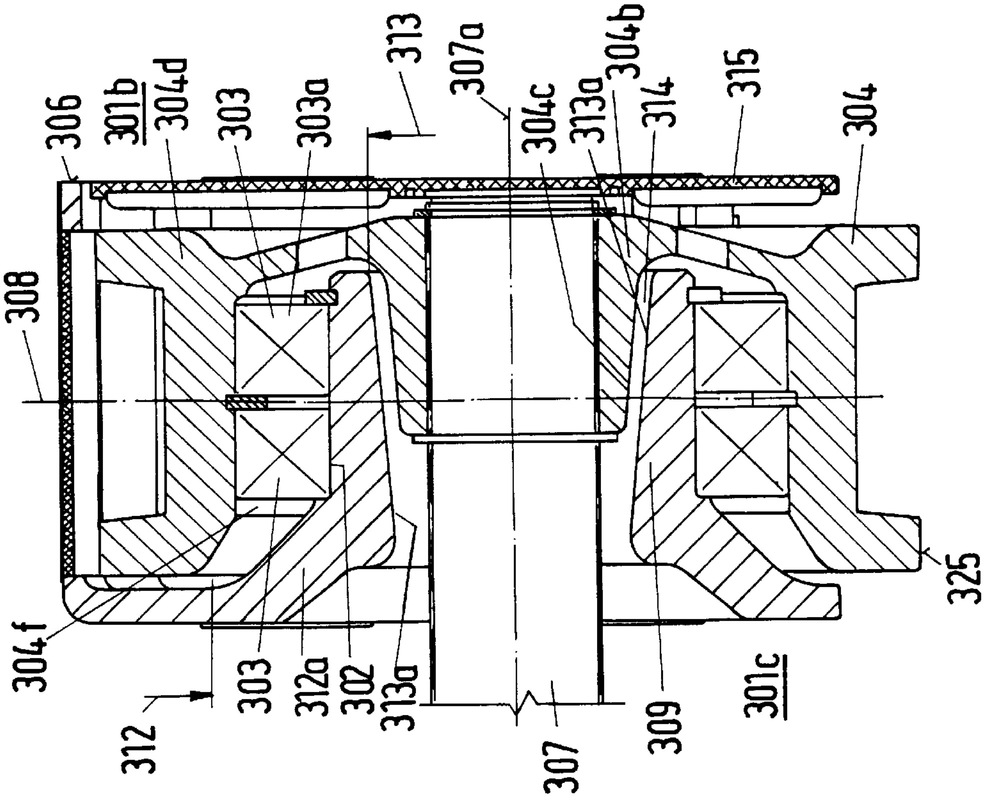
FIG. 4C is a vertical cross-section along line 4C—4C in the central plane of FIG. 2C.
Figure 3C:
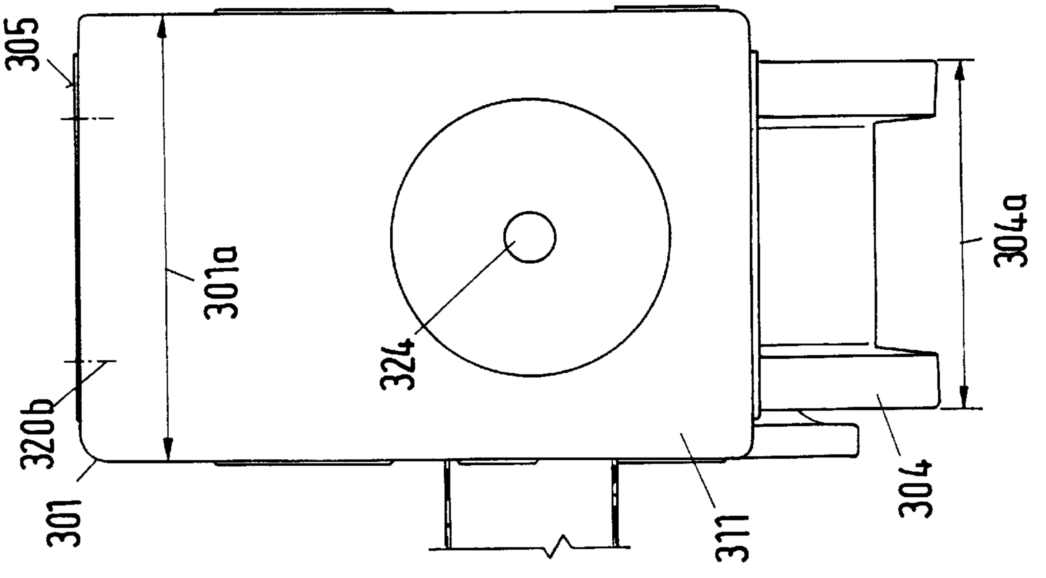
FIG. 3C is a front face view of the running wheel block.

A running wheel (FIGS. 1C and 4C) has a housing 301, in which there are rotary bearing seats 302 for rotary bearings 303, specifically, slide and/or roller bearings 303*a*, for the mounting of a running wheel 304, which projects downward, i.e., toward one side, with a section of its running surface. The running wheel 304 and/or the rotary bearings 303 can be removed without the housing 301 having to be separated from a carrier, travelling frame or the like (not shown), to which the housing 301 is attached oriented in multiple directions and in a detachable or non-detachable fashion. Arranged in the housing 301 is an inwardly directed holding hub 309*a* for rotary bearings.

Further, the housing 301 is open on the cheek side 306 opposite to the holding hub 309*a*. The running wheel 304 encompasses the housing hub 309, which is embodied as the holding hub 309*a*, and can be inserted onto or into the rotary bearing 303 from the open side 306.

The housing 301 shows at least one head attaching surface, which absorbs the carrying force and extends approximately to the housing width 301*a* or the running wheel width 304*a*. On a cheek side 306 directed toward the shaft axis 307*a* of the shaft 307, the housing 301 is embodied without a supporting housing part, so that a float-type mounting is created. The housing 301 is produced in one piece by casting, injection, forging, flow extrusion, deep drawing or similar production methods. The one-piece design means that multiple housing parts need not be connected to each other, as a result of which special attachment means as well as assembly times and production times (set-up times) are saved.

The formed-on housing hub 309 reaches axially to below the rotary bearing 303, holds the rotary bearing 303, and is arranged asymmetrically relative to the central plane 308. Correspondingly, the running wheel 304 is equipped with an asymmetrically formed-on running wheel hub 304*b*, which is connected to the shaft 307 and reaches from the open side 306 of the housing 301 into the housing hub 309. In a further improvement, the housing hub 309 and/or the running wheel hub 304*b* are embodied cylindrically or in graduated fashion.

The position and the carrying capacity are improved by the fact that the head connecting surface 305 and/or one cheek connecting surface 310 and/or one front connecting surface 311 are divided into supported and non-supported partial surfaces 305*a* and 305*b*. A supported partial surface 305*a* can thereby be undivided. The evenness of the surface can be produced more accurately with homogeneous material and smaller partial surfaces as the connecting surface than when several partial surfaces or large partial surfaces are used. Further, forces are introduced into the connecting structure in a defined manner via the smaller partial surfaces. This allows an optimized design of the connecting structure at a known force flow.

The strength (bending stress capacity) of the float mounting is influenced by its shape, whereby material can be saved. According to the invention, the housing hub 309, in the cross-section penetrated by the shaft 307, is embodied as a first cone 312*a* that faces away relative to the open cheek side 306 and the larger diameter 312 of which lies on the open cheek side 306. This design also permits a broad spectrum of manufacturing methods. As a result, an almost complete space utilization results in the case of parts embodied advantageously in terms of stress. A transition from the first cone designed advantageously with respect to production technology, as well as in a space-saving manner, is embodied so that, on the housing hub 309, in the cross-section penetrated from the shaft 307, a second cone 313*a* is attached in the opposite sense to the first cone 312*a*. The larger diameter 313 of the second cone 313*a* is arranged facing away relative to the larger diameter 312 of the first cone 312*a*. The outer surface 304*c* of the running wheel hub 304*b* of the inner surface 312*b* of the second cone 313*a* is adjusted with a distancing gap 314; the advantageous use of space can be taken to this extent. A stress-capable design is thereby created with the least possible consumption of material.

Given a suitable width of the rotary bearing 303, the length of the housing hub 309 can be shortened in such a way that the wheel rim 304*d* of the running wheel 304 and the running wheel hub 304*b* are connected by means of a web cross-section 304*e* embodied in a flatly conical manner relative to the width-central plane 308, thus achieving better use of space. To attain a compact design, the rotary bearings 303 can be arranged symmetrically relative to the width-central plane 308 in the interior 304*f* of the running wheel 304 or on the housing hub 309.

Figure 2C:
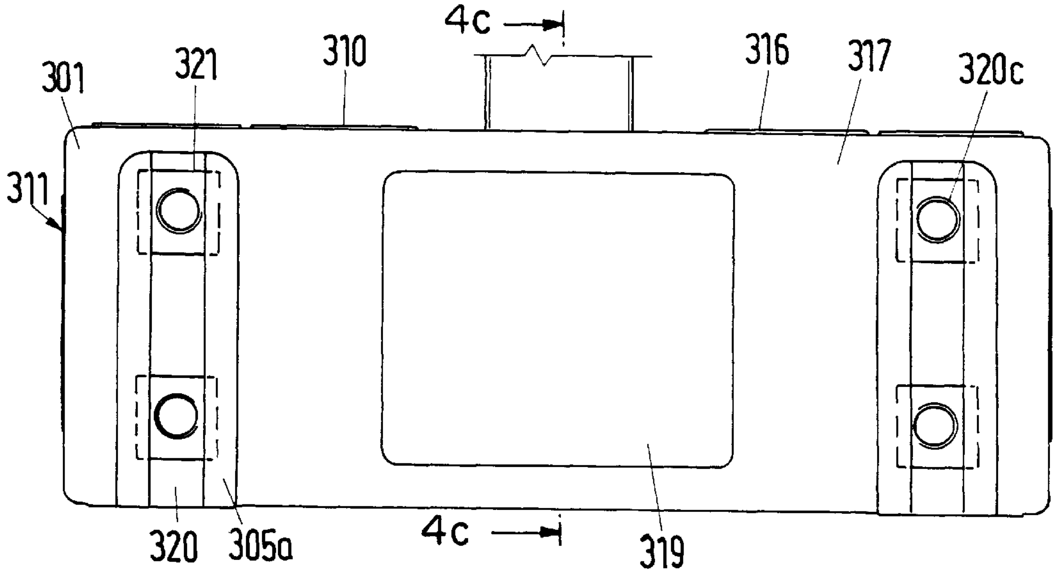
FIG. 2C is a top view associated with FIG. 1C.

Easy removal of the rotary bearing and/or of the running wheel accompanies, in principle, an opening that is to be created and must be protected against penetration by dust and dirt. The open cheek side 306, which is embodied without a supporting housing part, can be closed by means of a detachable cover disk 315. The detachable design facilitates a lateral removal of the bearing and/or of the running wheel. Lateral removal reduces the disassembly and assembly expense of the running wheel by the fact that now the supporting mechanism, the carrier or the travelling frame now needs to be elevated only by the wheel flange height of the running wheel. Opposite to the open cheek side 306, the housing 301, on the away-facing housing side 301*c* (opposite to the housing side 301*b*), is embodied with a flange contact surface 316 for attachment elements 317 (FIG. 2C).

The head connecting surface 305 has one or more through holes 318, which can be closed by means of closing pieces 319, which need not be made of the same material as the housing, because they do not absorb carrying forces or need to be of corresponding stress capacity. The closing pieces 319 prevent the penetration of dirt or other impurities even in the event that the open side of the housing, from which the running wheel projects, points in the direction of gravitation (downward). The solid side of the housing can be used for the purpose of flanging on and detachable or non-detachable attachment. Advantageously, the running wheel radius can also be enlarged by more than the thickness of the upper plate limit.

The head connecting surface 305 has at least one recess 320 that runs parallel to the running wheel axis 307*a*. As a result, prefabricated bolts can be used, which in turn permit an imprecise hole pattern of the counterpiece to be used without disadvantages, because the bolts can move in the recess and adjust to the imprecise hole pattern. Such a recess 320 can be designed as a channel guide 320*a*, a passage bore 320*b* or a threaded bore 320*c*. The suitable type of through hole can be selected in accordance with the precision of the connection. Channel nuts 321 for connecting screws 322 are run in the channel guides 320*a* in a cross-adjustable manner and with little play. This embodiment facilitates the connection and orientation between the supporting framework, carrier, travelling frame or the like and the housing of the running wheel block during initial assembly.

The entire wheel block is secured by either non-detachable or detachable attachment means to a travelling or supporting frame. On the head connecting surface 305 and/or on the outer front connecting surfaces 311 of the housing 301, there are holding means 323 for attachment elements, which, as shown, consist of inner eyes with through bores. Along with the channel guides 320*a* with channel nuts that are provided on the head connecting surface 305, recesses 324 can also be provided on the front connecting surfaces 311 of the housing 301.

At least one partial connecting surface 326 is formed on the outer surface 325 of the housing opposite to the head connecting surface 305. The outer front surfaces 311 of the housing 301 are undivided, and each constitutes an absorbing partial surface 327 for carrying forces. It is therefore also possible to attach other aggregates to these partial connecting surfaces, e.g., guide rollers, measurement devices and the like. This partial connecting surface can also be designed so that the entire running wheel block can be connected to this surface with the supporting framework, carrier or travelling frame.

The housing 301 and/or the cover disk 315 are made of a material to be processed in the molten state, which can be selected from a light metal alloy or a plastic, especially to save weight. When these materials are used, corrosion is also avoided. For higher strength requirements, it is foreseen that the material will consist of an iron alloy. Analogous to the corresponding manufacturing method, the material consists of a plastifiable plastic. It is also possible for the material to consist of a composite material or to form a composite material with other materials.

The invention is not limited by the embodiments described above which are presented as examples only but can be modified in various ways within the scope of protection defined by the appended patent claims.

We claim:

1. A running wheel block, comprising:

a housing having at least one connecting surface for connection to a supporting structure;

an inwardly directed rotary bearing holding hub arranged in the housing;

a rotary bearing mounted on the holding hub;

a running wheel mounted in the rotary bearing so that a section of its running surface projects from the housing toward at least one side, the housing being open on a side opposite to the holding hub, and the running wheel encompassing the holding hub and being insertable onto the rotary bearing from the open side, the holding hub being a housing hub formed asymmetrically to a center plane of the housing so as to hold the rotary bearing and extend axially below the rotary bearing, the running wheel having an asymmetrical running wheel hub; and a shaft that extends through the housing hub, the running wheel hub being mounted on the shaft and configured to reach into the housing hub from the open side of the housing.

2. A running wheel block as defined in claim 1, wherein the housing is configured as a single piece.

* * * * *